United States Patent
Yamaguchi et al.

(10) Patent No.: US 10,989,124 B2
(45) Date of Patent: Apr. 27, 2021

(54) ACTUATOR

(71) Applicant: DENSO CORPORATION, Kariya (JP)

(72) Inventors: Masashi Yamaguchi, Kariya (JP); Etsugo Yanagida, Kariya (JP); Naoaki Kono, Kariya (JP); Tetsuji Yamanaka, Kariya (JP); Atsushi Tanaka, Kariya (JP); Kunio Namba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/736,182

(22) Filed: Jan. 7, 2020

(65) Prior Publication Data
US 2020/0217255 A1    Jul. 9, 2020

(30) Foreign Application Priority Data
Jan. 9, 2019    (JP) .............................. JP2019-001516

(51) Int. Cl.
| F02D 41/00 | (2006.01) |
| F16K 31/04 | (2006.01) |
| F02B 37/22 | (2006.01) |
| F02D 23/00 | (2006.01) |
| F16K 37/00 | (2006.01) |

(52) U.S. Cl.
CPC .......... *F02D 41/0007* (2013.01); *F02B 37/22* (2013.01); *F02D 23/00* (2013.01); *F02D 41/0077* (2013.01); *F16K 31/047* (2013.01); *F16K 37/0041* (2013.01)

(58) Field of Classification Search
CPC .. F02D 41/0007; F02D 23/00; F02D 41/0077; F16K 31/047; F16K 37/0041; F16K 37/0033; F16K 31/535; F16K 31/043; F02B 37/22; F02B 37/186; F16H 55/06; F16H 1/20; F16H 57/021; F16H 57/023; F16H 55/17; F16H 2057/02034; F16H 2057/02043; H02K 7/116
See application file for complete search history.

(56) References Cited

U.S. PATENT DOCUMENTS

| 2014/0184204 A1 | 7/2014 | Kouno et al. |
| 2018/0187791 A1 | 7/2018 | Yamanaka et al. |

FOREIGN PATENT DOCUMENTS

| JP | 2019-078176 | 5/2019 |

OTHER PUBLICATIONS

U.S. Appl. No. 16/736,210 to Yamaguchi et al., entitled "Actuator", filed Jan. 7, 2020 (71 pages).
U.S. Appl. No. 16/736,247 to Hokuto et al., entitled "Actuator", filed Jan. 7, 2020 (47 pages).

*Primary Examiner* — Audrey K Bradley
*Assistant Examiner* — Edward Bushard
(74) *Attorney, Agent, or Firm* — Nixon & Vanderhye PC

(57) ABSTRACT

An actuator is configured to drive a boost pressure control valve of a supercharger. The actuator includes: an electric motor; an output shaft; and a speed reducer that is configured to transmit rotation, which is outputted from the electric motor, to the output shaft after reducing a speed of the rotation outputted from the electric motor. The speed reducer has a plurality of gears that include an output gear joined to the output shaft. The plurality of gears further includes a metal gear and a resin gear of a compound gear, which are respectively formed as a large diameter gear and a small diameter gear and are integrated together in one piece. The output gear is a resin gear.

9 Claims, 12 Drawing Sheets

FIG. 12

| | PINION GEAR | 1ST INT. GEAR | | 2ND INT. GEAR | | OUTPUT GEAR |
|---|---|---|---|---|---|---|
| | | LARGE DIAM. EXT. GEAR | SMALL DIAM. EXT. GEAR | LARGE DIAM. EXT. GEAR | SMALL DIAM. EXT. GEAR | |
| 1ST EMB. | METAL GEAR | METAL GEAR | METAL GEAR | METAL GEAR | RESIN GEAR | RESIN GEAR |
| 2ND EMB. | METAL GEAR | METAL GEAR | RESIN GEAR | RESIN GEAR | RESIN GEAR | RESIN GEAR |
| OTHER EMB. | RESIN GEAR | RESIN GEAR | METAL GEAR | METAL GEAR | RESIN GEAR | RESIN GEAR |

FIG. 13

| PINION GEAR | 1ST INT. GEAR | | 2ND INT. GEAR | | 3RD INT. GEAR | | OUTPUT GEAR |
|---|---|---|---|---|---|---|---|
| | LARGE DIAM. EXT. GEAR | SMALL DIAM. EXT. GEAR | LARGE DIAM. EXT. GEAR | SMALL DIAM. EXT. GEAR | LARGE DIAM. EXT. GEAR | SMALL DIAM. EXT. GEAR | |
| METAL GEAR | METAL GEAR | METAL GEAR | METAL GEAR | METAL GEAR | METAL GEAR | RESIN GEAR | RESIN GEAR |
| METAL GEAR | METAL GEAR | METAL GEAR | METAL GEAR | RESIN GEAR | RESIN GEAR | RESIN GEAR | RESIN GEAR |
| METAL GEAR | METAL GEAR | RESIN GEAR | RESIN GEAR | RESIN GEAR | RESIN GEAR | RESIN GEAR | RESIN GEAR |
| METAL GEAR | RESIN GEAR | RESIN GEAR | METAL GEAR | METAL GEAR | METAL GEAR | RESIN GEAR | RESIN GEAR |
| RESIN GEAR | RESIN GEAR | METAL GEAR | METAL GEAR | RESIN GEAR | RESIN GEAR | RESIN GEAR | RESIN GEAR |
| RESIN GEAR | RESIN GEAR | RESIN GEAR | RESIN GEAR | METAL GEAR | METAL GEAR | RESIN GEAR | RESIN GEAR |

ACTUATOR

CROSS REFERENCE TO RELATED APPLICATION

This application is based on and incorporates herein by reference Japanese Patent Application No. 2019-001516 filed on Jan. 9, 2019.

TECHNICAL FIELD

The present disclosure relates to an actuator.

BACKGROUND

There has been proposed an actuator that drives a boost pressure control valve of a turbocharger. The actuator reduces a speed of rotation outputted from an electric motor through a speed reducer to rotate an output shaft with a desired torque.

SUMMARY

This section provides a general summary of the disclosure, and is not a comprehensive disclosure of its full scope or all of its features.

According to the present disclosure, there is provided an actuator configured to drive a boost pressure control valve of a supercharger. The actuator includes an electric motor, an output shaft and a speed reducer. The speed reducer is configured to transmit rotation, which is outputted from the electric motor, to the output shaft after reducing a speed of the rotation outputted from the electric motor. The speed reducer includes a metal gear and a resin gear of a compound gear, which are respectively formed as a large diameter gear and a small diameter gear and are integrated together in one piece.

BRIEF DESCRIPTION OF THE DRAWINGS

The drawings described herein are for illustrative purposes only of selected embodiments and not all possible implementations, and are not intended to limit the scope of the present disclosure.

FIG. 12 is a descriptive diagram showing materials of respective gears of the first and second embodiments and another embodiment.

FIG. 13 is a descriptive diagram showing materials of respective gears in a case where the number of intermediate gears is three according to other embodiments.

DETAILED DESCRIPTION

Figure 1:
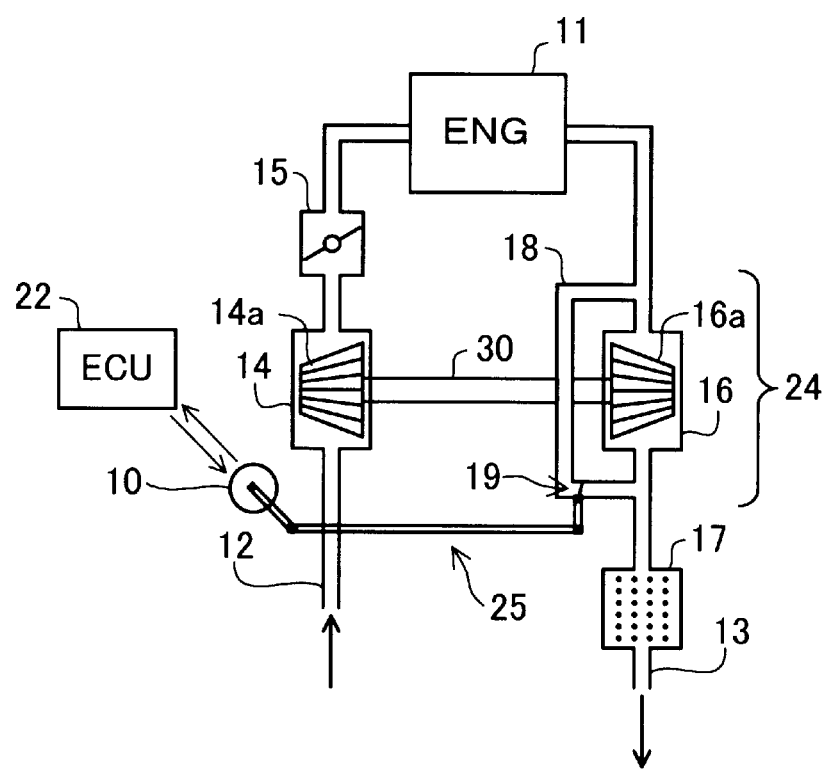
FIG. 1 is a schematic diagram of an intake and exhaust system of an internal combustion engine, to which an actuator of a first embodiment is applied.

There has been proposed an actuator that drives a boost pressure control valve of a turbocharger. The actuator reduces a speed of rotation outputted from an electric motor through a speed reducer to rotate an output shaft with a desired torque. A rotational angle of the output shaft is sensed with a contactless rotational angle sensor that includes a magnetic circuit device and a sensing device. A final gear of the speed reducer is a resin member that is integrally fixed to the output shaft, and the magnetic circuit device is insert molded in the final gear.

A stress generated by pulsation of exhaust gas pressure of the engine is applied to the actuator, which drives the boost pressure control valve, through the boost pressure control valve. An impact load is applied to the output shaft at a high frequency in response to a pulsation frequency of the pulsation of exhaust gas pressure of the engine, so that the speed reducer is required to have the wear resistance and the strength. Therefore, for instance, in a case where the actuator having the speed reducer is designed to be installed to the engine, which has a large exhaust gas pulsation, or a supercharger, which has a large wastegate port diameter, the wear resistance and the strength of the speed reducer of the actuator need to be improved. In the actuator discussed above, all of the gears are made of resin, so that although the actuator is advantageous in terms of the weight reduction, there are certain restrictions on the wear resistance and the strength for the above requirements. It is conceivable to form all of the gears from metal. However, the gear made of the metal (metal gear) has the larger inertia in comparison to the gear made of the resin (resin gear). Thus, in the case where all of the gears are formed as the metal gears, when the valve element receives the pulsation of exhaust gas pressure of the engine having the actuator, a larger impact load, which is larger in comparison to the case where the resin gears are used, is disadvantageously transmitted to an upstream side (motor side) gear.

According to one aspect of the present disclosure, there is provided an actuator configured to drive a boost pressure control valve of a supercharger. The actuator includes an electric motor, an output shaft, and a speed reducer. The speed reducer is configured to transmit rotation, which is outputted from the electric motor, to the output shaft after reducing a speed of the rotation outputted from the electric motor. The speed reducer has a plurality of gears that include an output gear joined to the output shaft. The plurality of gears further includes a metal gear and a resin gear of a compound gear, which are respectively formed as a large diameter gear and a small diameter gear and are integrated together in one piece. The metal gear is formed as a large diameter gear, and the resin gear is formed as a small diameter gear. The output gear is a resin gear. According to this aspect, the speed reducer includes the compound gear that has the metal gear (large diameter gear), which has the large diameter, and the resin gear (small diameter gear), which has the small diameter. Therefore, the wear resistance and the strength of teeth of the large diameter gear, which has a high rotational speed and a high wear stress, can be improved. Furthermore, since the small diameter gear is the resin gear, the inertia can be reduced. Thereby, the small diameter gear has the smaller inertia in comparison to the metal gear and can limit transmission of the large impact load to the upstream side (motor side) gear. Furthermore, wearing of the resin gear can be limited.

Now, embodiments of the present disclosure will be described with reference to the accompanying drawings.

First Embodiment

As shown in FIG. 1, an actuator 10 of a first embodiment is applied to an internal combustion engine (hereinafter simply referred to as an engine) 11 that is a drive source for driving a vehicle.

The engine 11 has an intake passage 12, which conducts the air to cylinders of the engine 11, and an exhaust passage 13, which discharges an exhaust gas generated at the cylinders to the atmosphere. A compressor wheel 14a of an intake compressor 14 of a supercharger 24 and a throttle valve 15 are installed in the intake passage 12. The compressor wheel 14a supercharges the air to the engine 11. The throttle valve 15 adjusts the amount of intake air supplied to the engine 11 according to the amount of depression of an accelerator pedal (not shown) of the vehicle.

A turbine wheel 16a of an exhaust turbine 16 of the supercharger 24 and a catalyst 17 for purifying the exhaust gas are installed in the exhaust passage 13. The turbine wheel 16a is connected to the compressor wheel 14a through a rotatable shaft 30. Specifically, the turbine wheel 16a is rotated by the exhaust gas energy of the engine 11 to rotate the compressor wheel 14a. The catalyst 17 is a known three-way catalyst, which has a monolithic structure. When the temperature of the catalyst 17 is raised to an activation temperature by the exhaust gas, the catalyst 17 purifies harmful substances contained in the exhaust gas through oxidation and reduction.

A bypass passage 18 is formed at the exhaust passage 13 in parallel with the turbine wheel 16a to conduct the exhaust gas while bypassing the turbine wheel 16a. A wastegate valve 19, which is a boost pressure control valve, is installed in the bypass passage 18. When the wastegate valve 19 is opened, a portion of the exhaust gas outputted from the engine 11 is directly guided to the catalyst 17 through the bypass passage 18. The wastegate valve 19 is opened when the pressure of the exhaust gas outputted from the engine 11 is increased beyond a valve opening pressure of the wastegate valve 19. Furthermore, the opening and closing of the wastegate valve 19 is also controlled by an engine control unit (ECU) 22. Specifically, the ECU 22 drives the actuator 10 to open and close the wastegate valve 19 through a linkage mechanism 25 that is installed between the actuator 10 and the wastegate valve 19.

Figure 2:
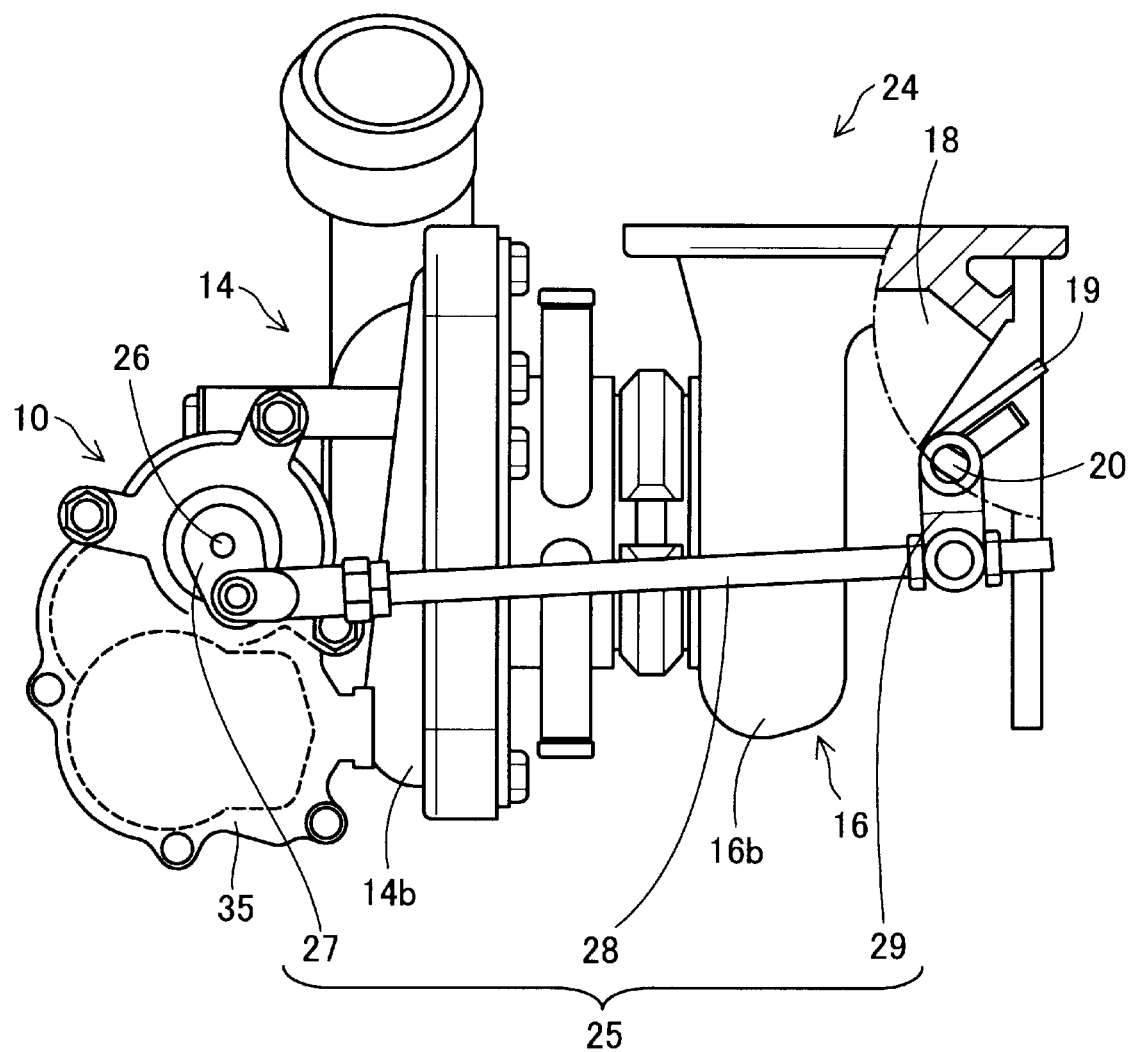
FIG. 2 is a descriptive diagram of a supercharger of the first embodiment.

As shown in FIG. 2, the supercharger 24 includes the exhaust turbine 16, the intake compressor 14 and the actuator 10. The exhaust turbine 16 includes the turbine wheel 16a (see FIG. 1), which is rotated by the exhaust gas outputted from the engine 11, and a turbine housing 16b, which is shaped in a spiral form and receives the turbine wheel 16a. The intake compressor 14 includes the compressor wheel 14a (see FIG. 1), which is rotated by the rotational force of the turbine wheel 16a, and a compressor housing 14b, which is shaped in a spiral form and receives the compressor wheel 14a. The turbine wheel 16a and the compressor wheel 14a are connected with each other by the rotatable shaft 30 (see FIG. 1).

Besides the turbine wheel 16a, the bypass passage 18 is provided at the turbine housing 16b. The bypass passage 18 directly conducts the exhaust gas, which enters the turbine housing 16b, to an exhaust gas outlet of the turbine housing 16b without supplying the exhaust gas to the turbine wheel 16a. The bypass passage 18 is opened and closed by the wastegate valve 19. The wastegate valve 19 is a swing valve that is rotatably supported by a valve shaft 20 at the inside of the turbine housing 16b. Although the wastegate valve 19 is opened when the pressure of the exhaust gas is increased beyond the valve opening pressure, the wastegate valve 19 can be opened and closed by the actuator 10.

A housing 35, which receives the actuator 10, is installed to the intake compressor 14 that is spaced from the exhaust turbine 16 of the supercharger 24. With this configuration, it is possible to avoid an influence of a heat of the exhaust gas on the actuator 10. The supercharger 24 includes a linkage mechanism 25 (see FIG. 1) that transmits the output of the actuator 10 to the wastegate valve 19. In the present embodiment, the linkage mechanism 25 is a four-bar linkage mechanism that includes an actuator lever 27, a rod 28 and a valve lever 29. The actuator lever 27 is joined to the output shaft 26 of the actuator 10 and is rotated by the actuator 10. The valve lever 29 is joined to the valve shaft 20. The rod 28 transmits the rotational torque, which is applied to the actuator lever 27, to the valve lever 29.

The operation of the actuator 10 is controlled by the ECU 22 that has a microcomputer. Specifically, the ECU 22 controls the actuator 10 to adjust the opening degree of the wastegate valve 19 at the time of, for example, rotating the engine 11 at a high rotational speed to control the boost pressure of the supercharger 24. Furthermore, when the temperature of the catalyst 17 does not reach the activation temperature at, for example, the time immediately after cold start of the engine 11, the ECU 22 controls the actuator 10 to fully open the wastegate valve 19 to warm up the catalyst 17 with the exhaust gas. In this way, the high temperature exhaust gas, which has not lost its heat to the turbine wheel 16a, can be directly conducted to the catalyst 17, so that the catalyst 17 can be warmed up within a short period of time.

Figure 3:
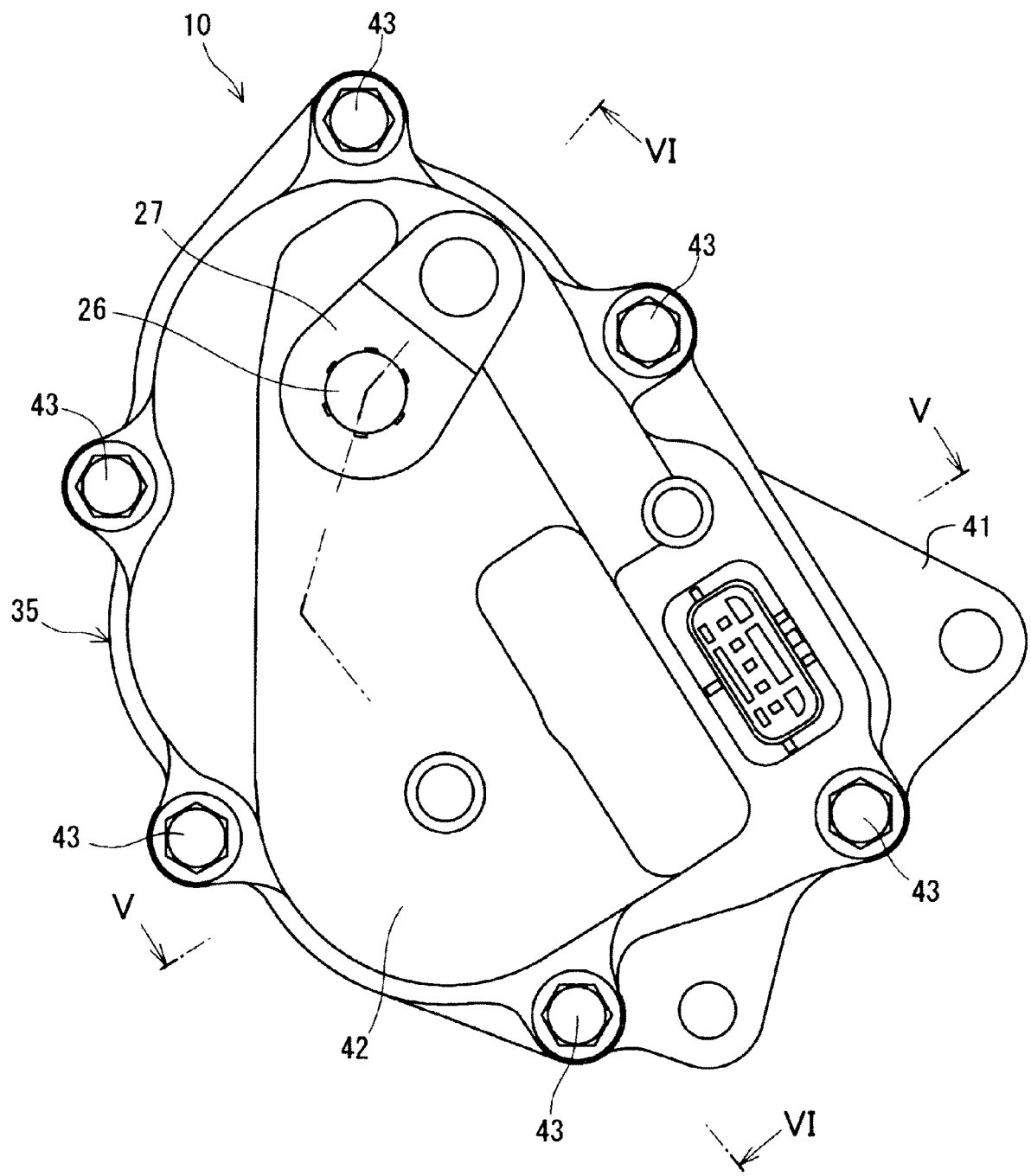
FIG. 3 is a plan view of the actuator of the first embodiment.

Next, the actuator 10 will be described with reference to FIGS. 3 to 6. The actuator 10 is received in the housing 35 that is installed to the intake compressor 14. As shown in FIG. 3, the housing 35 includes a first housing segment 41 and a second housing segment 42. The second housing segment 42 will be also referred to as a case 42. The first housing segment 41 and the second housing segment 42 are made of a metal material, such as aluminum, an aluminum alloy or iron steel. Alternatively, the first housing segment 41 and the second housing segment 42 may be made of resin. Furthermore, the first housing segment 41 and the second housing segment 42 may be formed by any manufacturing method among die casting, gravity casting, injection molding or press working. The second housing segment 42 is joined to the first housing segment 41 by fastening members (fasteners) 43. An output shaft 26 projects from the second housing segment 42 and is joined to the actuator lever 27.

Figure 4:
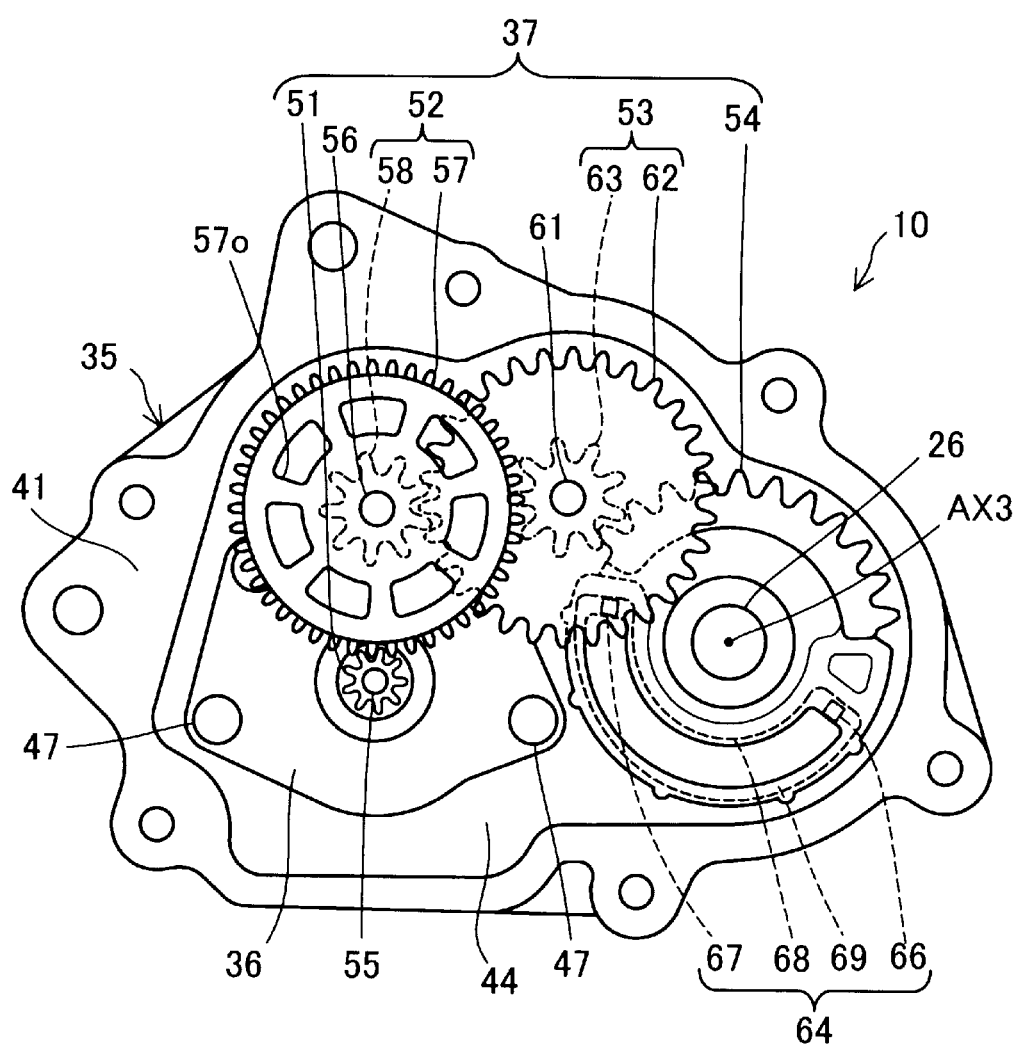
FIG. 4 is a descriptive diagram indicating respective gears of a speed reducer of the first embodiment.
Figure 5:
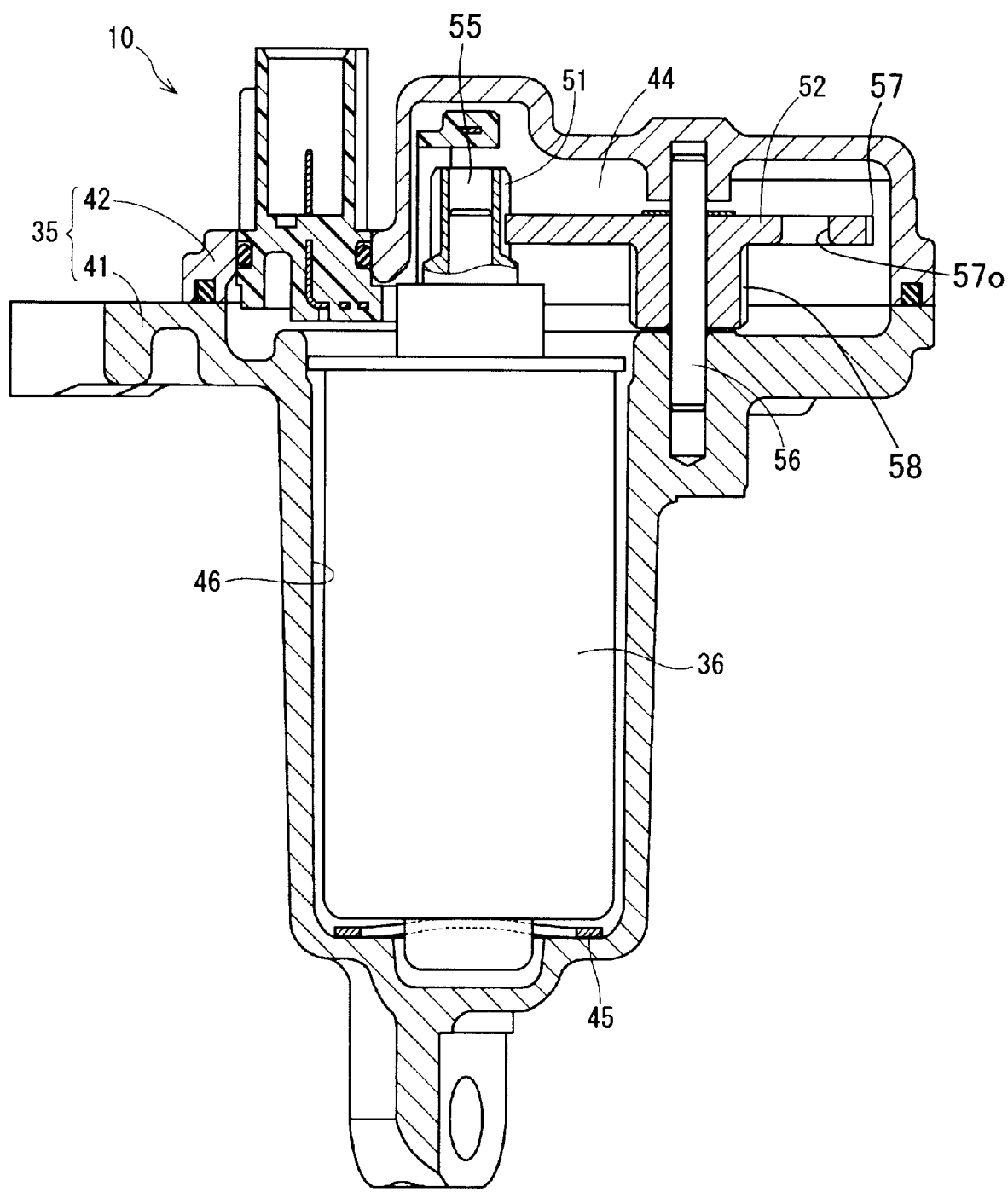
FIG. 5 is a cross-sectional view taken along line V-V in FIG. 3.

As shown in FIGS. 4 and 5, the first housing segment 41 and the second housing segment 42 cooperate together to form a receiving space 44 therein. An electric motor 36 is received in the receiving space 44. Specifically, the electric motor 36 is inserted into a motor insertion hole 46 formed at the first housing segment 41 and is fixed to the first housing segment 41 by screws 47. A wave washer 45 is installed between the electric motor 36 and a bottom surface of the motor insertion hole 46. The wave washer 45 may be eliminated if desired. The electric motor 36 may be any type of electric motor, such as a known DC motor, a known stepping motor or the like.

Figure 6:
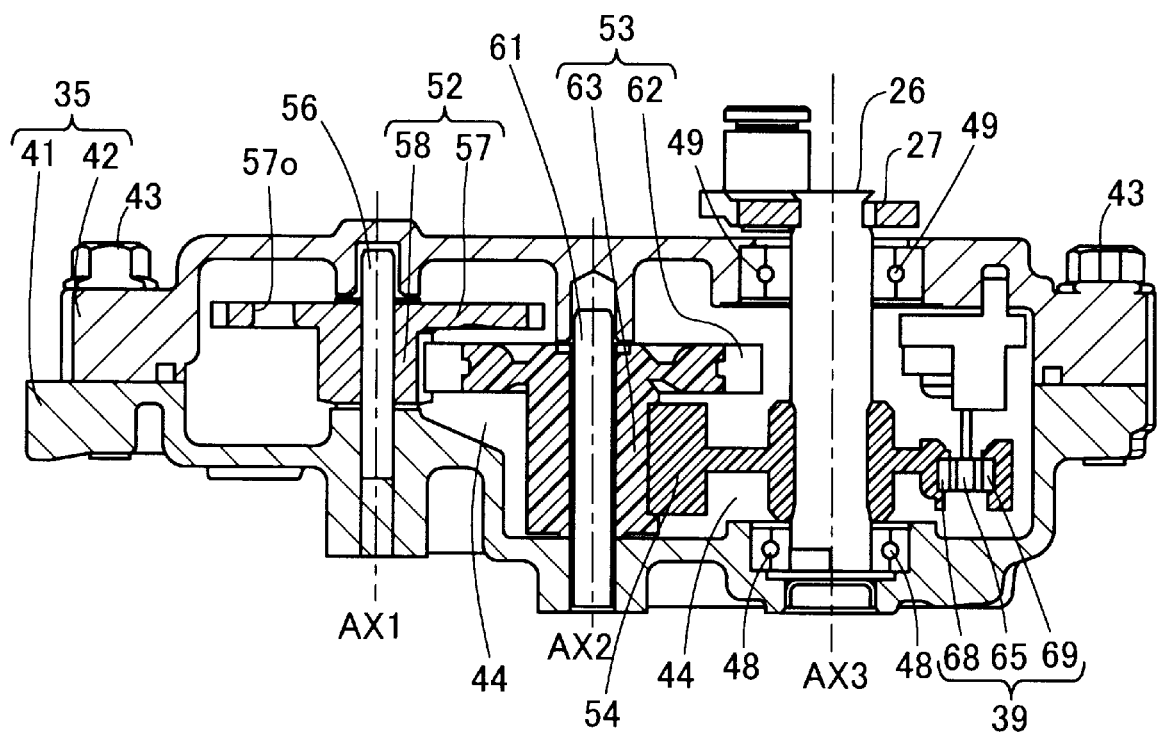
FIG. 6 is a cross-sectional view taken along line VI-VI in FIG. 3.

As shown in FIGS. 4 and 6, the actuator 10 includes the speed reducer 37. The speed reducer 37 is a parallel shaft speed reducer that reduces the speed of the rotation outputted from the electric motor 36 and transmits the rotation of the reduced speed to the output shaft 26. The speed reducer 37 includes a plurality of gears. In the present embodiment, the plurality of gears of the speed reducer 37 includes a pinion gear 51, a first intermediate gear 52, a second intermediate gear 53 and an output gear 54.

The pinion gear 51 is fixed to the motor shaft 55 of the electric motor 36. The pinion gear 51 is a metal gear made of metal. For example, iron-based sintered metal is used as this metal.

The first intermediate gear 52 is a compound gear that includes a first large diameter external gear 57 and a first small diameter external gear 58, and the first intermediate gear 52 is rotatably supported by a first metal shaft 56. The first intermediate gear 52 is configured to rotate about the first metal shaft 56 that is a shaft of the first intermediate gear 52. The first large diameter external gear 57 is a large diameter gear (or simply referred to as a large gear) and is meshed with the pinion gear 51 that is fixed to the motor shaft 55 of the electric motor 36. The first small diameter external gear 58 is a small diameter gear (or simply referred to as a small gear) that has a diameter, which is smaller than that of the first large diameter external gear 57. The first large diameter external gear 57 and the first small diameter external gear 58 are metal gears made of metal. For example, iron-based sintered metal is used as this metal. The first large diameter external gear 57 has a plurality of openings 57o to reduce the inertia of the first large diameter external gear 57.

The second intermediate gear 53 is a compound gear that includes a second large diameter external gear 62 and a second small diameter external gear 63, and the second intermediate gear 53 is rotatably supported by a second metal shaft 61. The second intermediate gear 53 is configured to rotate about the second metal shaft 61 that is a shaft of the second intermediate gear 53. The second large diameter external gear 62 is a large diameter gear and is meshed with the first small diameter external gear 58 of the first intermediate gear 52. The second large diameter external gear 62 is a metal gear made of metal. For example, iron-based sintered metal is used as this metal. The second small diameter external gear 63 is a small diameter gear that has a diameter smaller than that of the second large diameter external gear 62. Furthermore, the second small diameter external gear 63 is a resin gear that is made of resin. For example, polyamide resin, nylon resin or the polyacetal resin may be used as the resin. The resin gear has the smaller inertia in comparison to the metal gear. Therefore, in a case where the large impact load is applied to the second intermediate gear 53 by the pulsation of the exhaust gas pressure of the engine 11 through the wastegate valve 19, the valve lever 29, the rod 28, the actuator lever 27, the output shaft 26 and the output gear 54, it is possible to limit or minimize the transmission of the impact load to the second intermediate gear 53 and the gears, such as the first intermediate gear 52 and the pinion gear 51, which are located on the upstream side (the motor side) of the second intermediate gear 53. Furthermore, since the output gear 54 is formed as the resin gear, it is possible to limit or minimize the transmission of the impact load to the output gear 54 and the gears, such as the second intermediate gear 53, the first intermediate gear 52 and the pinion gear 51, which are located on the upstream side (the motor side) of the output gear 54.

The output gear 54 is meshed with the second small diameter external gear 63, and the output shaft 26 is coupled to and is fixed to the output gear 54 along a central axis AX3 of the output gear 54. The central axis AX3 may be simply referred to as an axis AX3. Also, a central axis AX1 of the first intermediate gear 52 and a central axis Ax2 of the second intermediate gear 53 may be also referred to as an axis AX1 and an axis Ax2, respectively. The output gear 54 is a resin gear made of resin. Therefore, in the first embodiment, the pinion gear 51, the first large diameter external gear 57, the first small diameter external gear 58 and the second large diameter external gear 62, which are located at the upstream side in the transmission path between the electric motor 36 and the output shaft 26, are the metal gears, and the second small diameter external gear 63 and the output gear 54, which are located at the downstream side in the transmission path, are the resin gears. Specifically, among the gears of the speed reducer 37, the gears, which are other than the output gear 54 and the second small diameter external gear 63 of the second intermediate gear (the compound gear) 53 meshed with the output gear 54, are the metal gears. Therefore, the meshing between the gears is limited to the meshing between the resin gears and the meshing between the metal gears, and there is no meshing between the resin gear and the metal gear. Thereby, it is possible to limit wearing of the resin gears.

As shown in FIGS. 5 and 6, the actuator 10 includes: the first housing segment (also simply referred to as a housing) 41, which receives the electric motor 36, the output shaft 26 and the speed reducer 37; and the second housing segment 42, which is also referred to as the case and is installed to the first housing segment 41 to cover the inside of the first housing segment 41. One end portion of the second metal shaft 61 is fixed to the first housing segment 41, and the other end portion of the second metal shaft 61 is supported by the second housing segment 42. Thus, in comparison to a case where the one end portion of the second metal shaft 61 is fixed to the first housing segment 41, and the other end portion of the second metal shaft 61 is not supported, it is possible to reduce the deformation of the second metal shaft 61 that is caused by vibration and/or torque generated by the operation of the electric motor 36 and/or the pulsation transmitted from the wastegate valve 19.

Magnets (serving as magnetic flux generators) 66, 67 and yokes (serving as magnetic flux conductors) 68, 69 are installed to the output gear 54. The magnets 66, 67 and the yokes 68, 69 form a magnetic circuit device 64 that forms a closed magnetic circuit and is shaped in an arcuate form in a view taken in an axial direction of the output shaft 26. The magnetic circuit device 64 is rotated integrally with the output gear 54 and the output shaft 26.

A magnetic flux sensing device 65, which senses a magnetic flux generated from the magnets 66, 67, is installed at an inside of the closed magnetic circuit of the magnetic circuit device 64 of the output gear 54. For example, a Hall IC is used to form the magnetic flux sensing device 65. The magnetic circuit device 64 and the magnetic flux sensing device 65 function as a rotational angle sensor 39 that senses a rotational angle of the output shaft 26. The basic applications and functions of the magnetic circuit device 64 and the magnetic flux sensing device 65 are the same as those disclosed in JP2014-126548A (corresponding to US2014/0184204A, the disclosure of which is incorporated herein by reference in its entirety). The rotational angle of the output shaft 26, which is sensed with the rotational angle sensor 39, is outputted to the ECU 22 (see FIG. 1). The structures of the magnetic circuit device 64 and the magnetic flux sensing device 65 shown in FIG. 6 are only one example, and the magnetic circuit device 64 and the magnetic flux sensing device 65 may have another type of structures.

As shown in FIG. 6, the output shaft 26 is rotatably supported by a bearing 48, which is installed to the first housing segment 41, and a bearing 49, which is installed to the second housing segment 42. One end portion of the output shaft 26 outwardly projects from the second housing segment 42 of the housing 35. The actuator lever 27 is fixed to the output shaft 26 at the outside of the second housing segment 42.

According to the first embodiment, the speed reducer 37 includes the plurality of gears, i.e., the pinion gear 51, the first intermediate gear 52, the second intermediate gear 53 and the output gear 54, and the second intermediate gear 53 is the compound gear that has the second large diameter external gear 62, which is the metal gear, and the second small diameter external gear 63, which is the resin gear. Specifically, the gear, which is located on the downstream side of the second small diameter external gear 63 of the second intermediate gear 53, is the resin gear and has the small inertia. Therefore, in the case where the large impact load is applied to the second intermediate gear 53 by the pulsation of the exhaust gas pressure of the engine 11 through the wastegate valve 19, the valve lever 29, the rod 28, the actuator lever 27, the output shaft 26 and the output gear 54, it is possible to limit the transmission of this impact to the second intermediate gear 53 and the upstream side (motor side) gears, such as the first intermediate gear 52 and the pinion gear 51, which are located on the upstream side of the second intermediate gear 53. Furthermore, in the case where the large impact load is applied to the output gear 54, since the output gear 54 is formed as the resin gear, it is possible to limit the transmission of this impact to the output gear 54 and the upstream side (motor side) gears, such as the second intermediate gear 53, the first intermediate gear 52 and the pinion gear 51, which are located on the upstream side of the output gear 54.

Furthermore, each of the meshing between the pinion gear 51 and the first large diameter external gear 57 of the first intermediate gear 52 and the meshing between the first small diameter external gear 58 of the first intermediate gear 52 and the second large diameter external gear 62 of the second intermediate gear 53 is the meshing between the metal gears. In contrast, the meshing between the second small diameter external gear 63 of the second intermediate gear 53 and the output gear 54 is the meshing between the resin gears. That is, there is no meshing between the metal gear and the resin gear. Therefore, it is possible to limit stress concentration and an increase in the specific wear amount caused by the meshing between the different materials that have substantially different physical properties, and thereby it is possible to limit the wearing of the resin gears. Specifically, it is possible to limit the wearing of the second small diameter external gear 63 and the output gear 54, which are the resin gears. Here, it should be understood that the meshing between the metal gear and the resin gear may be provided depending on a need. For example, among the meshing between the pinion gear 51 and the first large diameter external gear 57 of the first intermediate gear 52, the meshing between the first small diameter external gear 58 of the first intermediate gear 52 and the second large diameter external gear 62 of the second intermediate gear 53, and the meshing between the second small diameter external gear 63 of the second intermediate gear 53 and the output gear 54, the meshing, which generates a relatively low stress, may be made as meshing between the metal gear and the resin gear. For instance, the first small diameter external gear 58 of the first intermediate gear 52 may be formed as a metal gear, and the second large diameter external gear 62 of the second intermediate gear 53 may be formed as a resin gear, and thereby implementing the meshing between the metal gear and the resin gear.

According to the first embodiment, the output gear 54 is the resin gear and includes the magnets (the magnetic flux generators) 66, 67. Therefore, even if the second small diameter external gear 63 and the output gear 54 made of the resin are worn, it is possible to reduce adhesion of abrasion particles, such as metal particles, to the magnetic flux sensing device 65, the magnets (the magnetic flux generators) 66, 67 and the yokes 68, 69.

According to the first embodiment, among the gears of the speed reducer 37, the gears, which are other than the output gear 54 and the second small diameter external gear 63 of the second intermediate gear (the compound gear) 53 meshed with the output gear 54, are the metal gears. Therefore, the size of the second large diameter external gear (a high speed side gear, i.e., a motor side gear) 62 can be reduced. Thus, the sizes of the output gear 54 and the second small diameter external gear (the small diameter gear) 63 of the second intermediate gear (the compound gear) 53, which are designed to implement the same size and the same speed reduction ratio of the previously proposed actuator, can be increased. As a result, wearing of the output gear (the resin gear) 54 and the second small diameter external gear 63 of the compound gear can be limited. Furthermore, since the openings 57o are formed at the first large diameter external gear 57 of the first intermediate gear 52, it is possible to reduce the inertia. Specifically, it is possible to achieve both of the reduction in the inertia and the limiting of the wearing of the resin gear.

Second Embodiment

Figure 7:
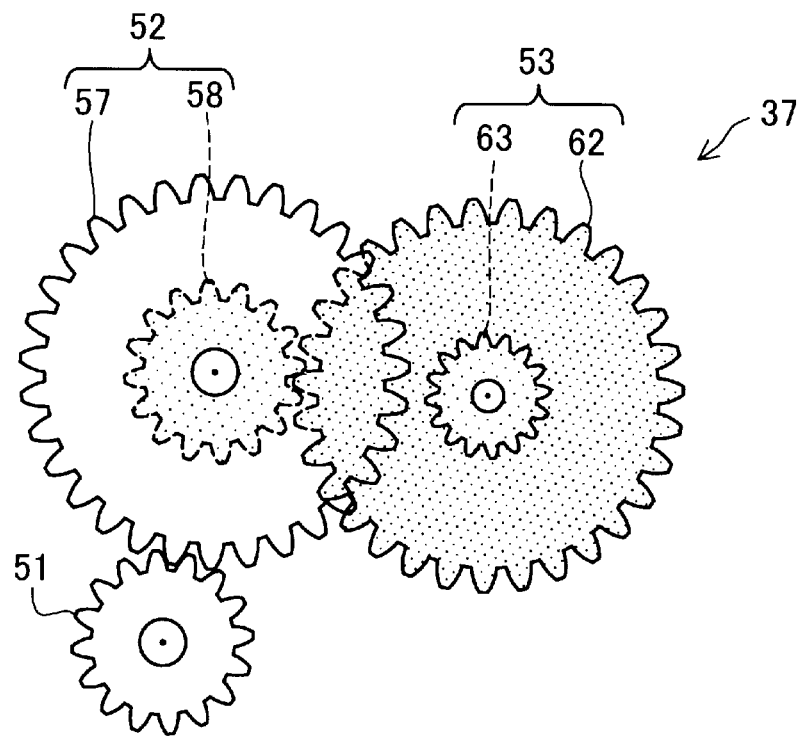
FIG. 7 is a descriptive diagram showing gears according to a second embodiment.

The speed reducer 37 of the actuator 10a of a second embodiment shown in FIG. 7 includes the pinion gear 51, the first intermediate gear 52 and the second intermediate gear 53. In FIG. 7, in order to simplify the drawing, the indication of the output gear 54, which is meshed with the second small diameter external gear 63 of the second intermediate gear 53, is omitted. Furthermore, in the second embodiment and a third embodiment described later, except the reference sign of the actuator, the same reference sings are used for the components, which are the same as those of the first embodiment, for the sake of easy description, even if the material is different from that of the first embodiment. The second large diameter external gear 62 and the second small diameter external gear 63 of the second intermediate gear 53 are both formed as resin gears, respectively. Furthermore, the first large diameter external gear 57 of the first intermediate gear 52 is formed as a metal gear, and the first small diameter external gear 58 is formed as a resin gear. Furthermore, similar to the first embodiment, the pinion gear 51 is the metal gear, and the output gear 54 is the resin gear. In the first embodiment, since the first large diameter external gear 57 and the first small diameter external gear 58 of the first intermediate gear 52 are formed as the metal gears, respectively, the openings 57o for reducing the inertia are provided. However, the openings 57o for reducing the inertia are not formed at the first large diameter external gear 57 of the first intermediate gear 52 in the present embodiment. This is to improve the close contact between the resin gear and the metal gear. In the second embodiment, the pinion gear 51 and the first large diameter external gear 57, which are located at the upstream side, are respectively formed as the metal gears, and the first small diameter external gear 58, the second large diameter external gear 62, the second small diameter external gear 63 and the output gear 54, which are located at the downstream side, are respectively formed as the resin gears. Therefore, in the case where the large impact load is applied to the second intermediate gear 53 by the pulsation of the exhaust gas pressure of the engine 11 through the wastegate valve 19, the valve lever 29, the rod 28, the actuator lever 27, the output shaft 26 and the output gear 54*a*, it is possible to limit the transmission of this impact to the second intermediate gear 53 and the upstream side (motor side) gears, such as the first intermediate gear 52 and the pinion gear 51, which are located on the upstream side of the second intermediate gear 53. Furthermore, in the case where the large impact load is applied to the output gear 54, since the output gear 54 is formed as the resin gear, it is possible to limit the transmission of this impact to the output gear 54 and the upstream side (motor side) gears, such as the second intermediate gear 53, the first intermediate gear 52 and the pinion gear 51, which are located on the upstream side of the output gear 54.

According to the second embodiment, each of the meshing between the pinion gear 51 and the first large diameter external gear 57 of the first intermediate gear 52 is the meshing between the metal gears. In contrast, each of the meshing between the first small diameter external gear 58 of the first intermediate gear 52 and the second large diameter external gear 62 of the second intermediate gear 53 and the meshing between the second small diameter external gear 63 of the second intermediate gear 53 and the output gear 54 is the meshing between the resin gears. Therefore, the meshing between the metal gear and the resin gear does not exist, and thereby it is possible to limit the wearing of the first small diameter external gear 58, the second large diameter external gear 62, the second small diameter external gear 63 and the output gear 54, which are respectively formed as the resin gears.

According to the second embodiment, similar to the first embodiment, the output gear 54 is the resin gear and includes the magnets (the magnetic flux generators) 66, 67. Therefore, even if the second small diameter external gear 63 and the output gear 54 are worn, it is possible to reduce the adhesion of abrasion particles, such as metal particles, to the magnetic flux sensing device 65, the magnets (the magnetic flux generators) 66, 67 and the yokes 68, 69.

Third Embodiment

Figure 8:
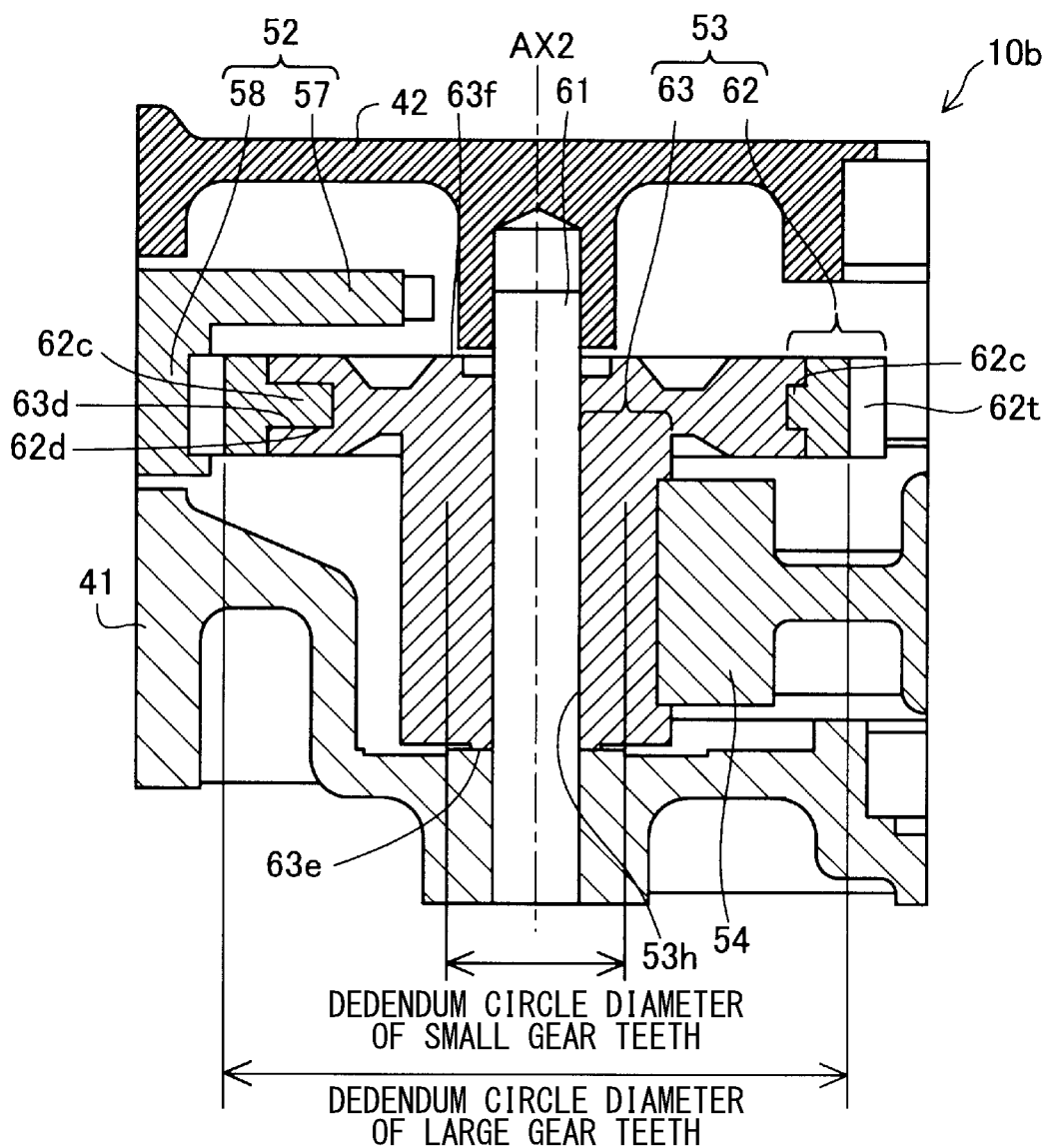
FIG. 8 is a descriptive diagram showing a second intermediate gear and its periphery according to a third embodiment.

The actuator 10*b* of a third embodiment shown in FIG. 8 is implemented by changing the configuration of the second intermediate gear 53 in the actuator 10 of the first embodiment. Other than the above point, the third embodiment is the same as the first embodiment.

Figure 9:
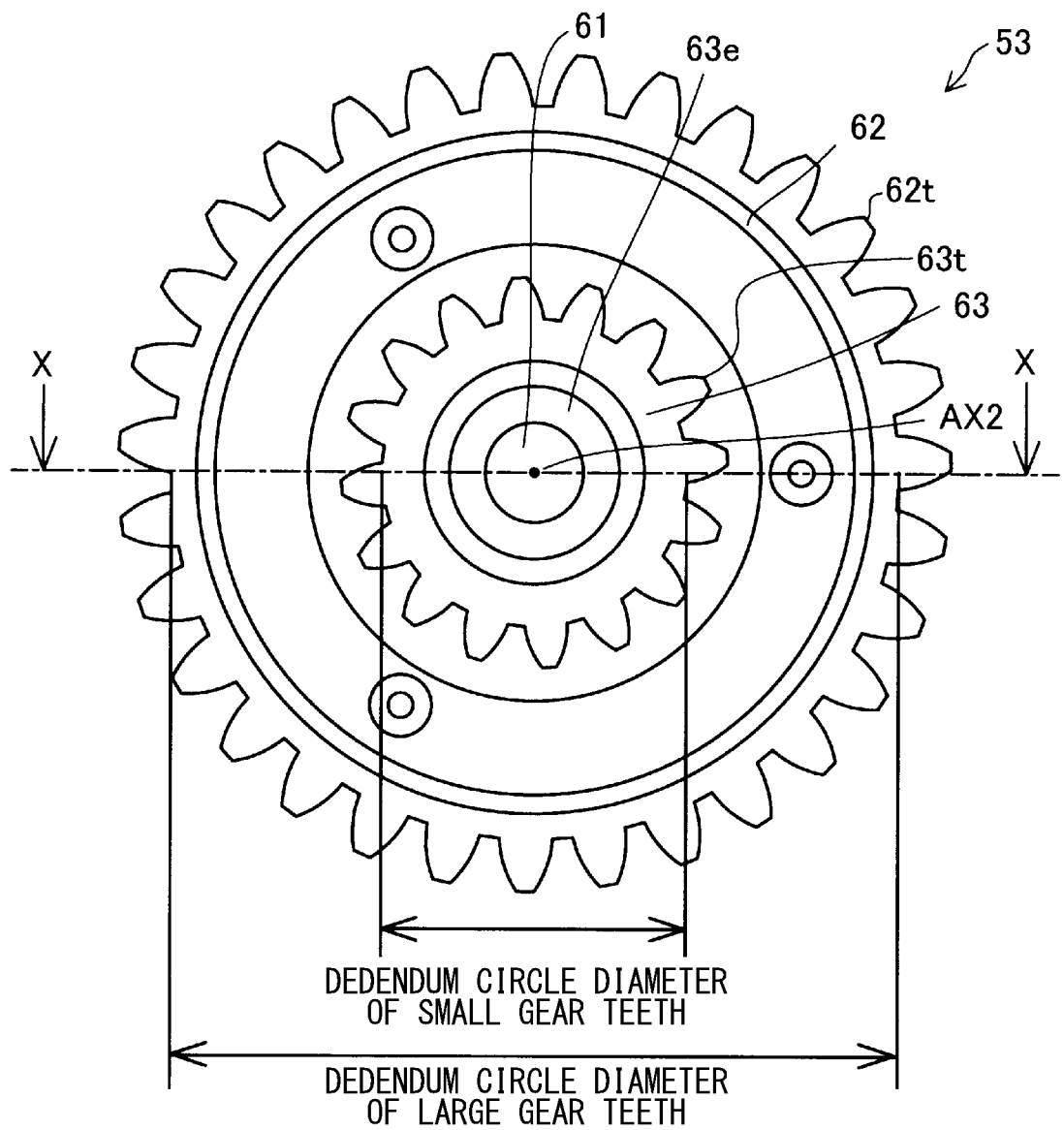
FIG. 9 is a descriptive diagram showing the second intermediate gear of the third embodiment seen in an axial direction.
Figure 10:
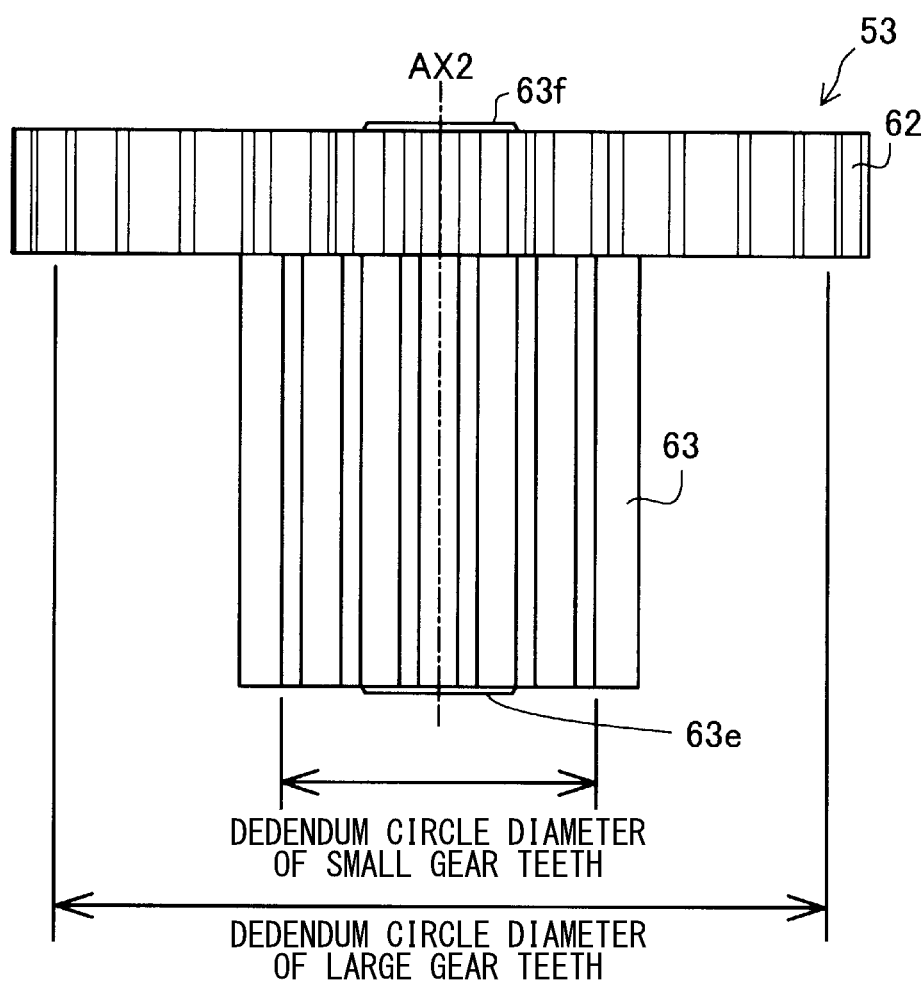
FIG. 10 is a side view of the second intermediate gear of the third embodiment.
Figure 11:
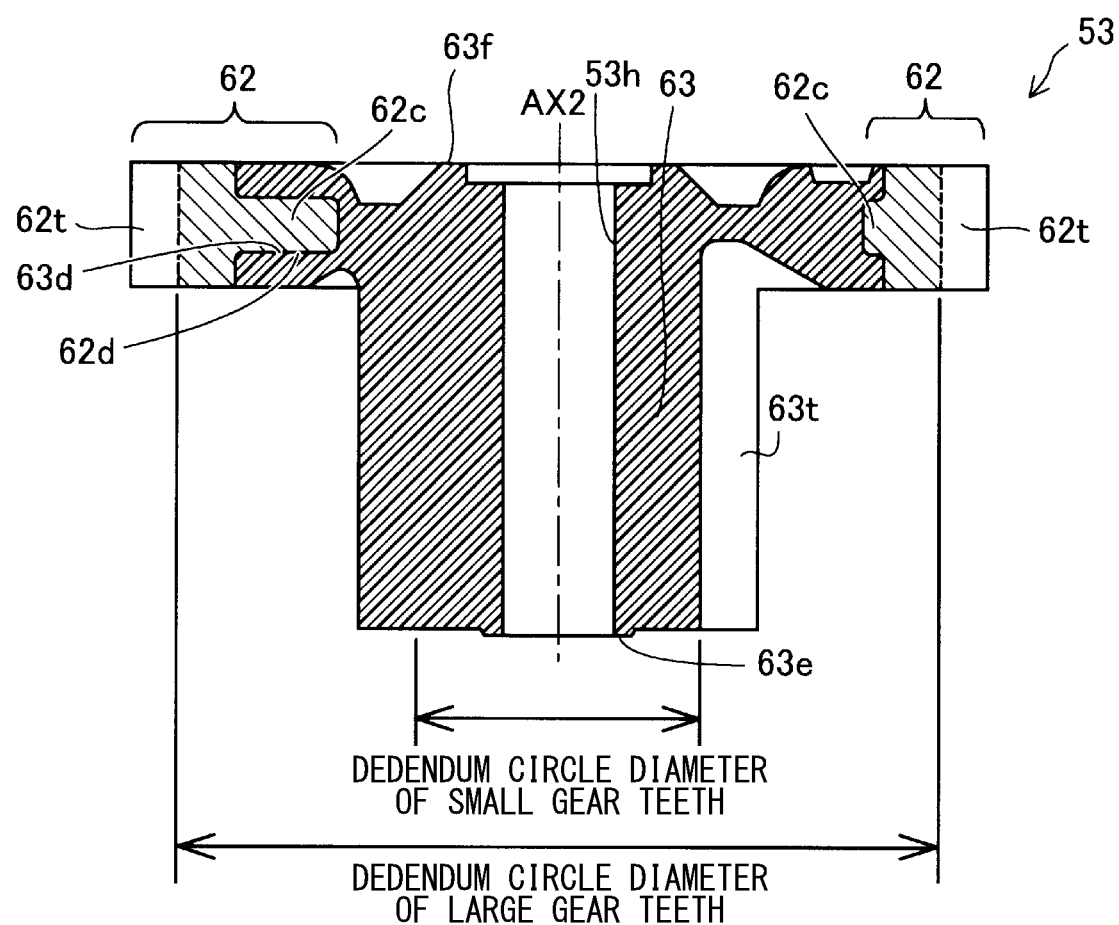
FIG. 11 is a diagram showing a cross section of the second intermediate gear of the third embodiment that is parallel with an axis of the second intermediate gear.

FIG. 9 indicates the second intermediate gear 53 seen from the second small diameter external gear 63 side. FIG. 10 indicates the second intermediate gear 53 seen in a direction perpendicular to the rotational axis AX2. FIG. 11 is a cross-sectional view taken along line X-X in FIG. 9. As shown in FIGS. 8 to 11, the second large diameter external gear 62, which is formed as the metal gear, of the second intermediate gear 53 has a plurality of projections 62*c*, which are circumferentially arranged and are located on the radially inner side of large gear teeth 62*t* of the second large diameter external gear 62 and project toward the second metal shaft 61. In the present embodiment, for the sake of convenience, the teeth of the large diameter gear are referred to as "large gear teeth", and the teeth of the small diameter gear are referred to as "small gear teeth." Each of the projections 62*c* has a contact surface 62*d* at each of two opposite axial sides of the projection 62*c*. At each of the two opposite axial sides of the projection 62*c*, the contact surface 62*d* contacts the resin of the second small diameter external gear 63 in the axial direction of the axis AX2. Specifically, the second small diameter external gear 63 has a corresponding contact surface 63*d*, which contacts the contact surface 62*d* of the projection 62*c* at each of the two opposite axial sides of the projection 62*c*. According to the third embodiment, a contact surface area of the second large diameter external gear (the metal gear) 62 relative to the resin of the second small diameter external gear (resin gear) 63 can be increased. Therefore, the second large diameter external gear 62 and the second small diameter external gear 63 can be joined such that relative movement between the second large diameter external gear 62 and the second small diameter external gear 63 is less likely to occur.

The second small diameter external gear 63, which is the resin gear, of the second intermediate gear 53 has a center hole (central axis hole) 53*h*, and the second metal shaft 61 is inserted into the center hole 53*h*, so that the second small diameter external gear 63 is supported in a manner that enables the rotation of the second small diameter external gear 63 about the second metal shaft 61. By forming the center hole 53*h* at the second small diameter external gear 63, which is the resin gear, the number of the components can be reduced.

As shown in FIGS. 8 to 11, the second small diameter external gear 63 of the second intermediate gear 53 is placed such that the second small diameter external gear 63 can contact the first housing segment 41 and the second housing segment 42. A contacting end surface of the second small diameter external gear 63, which is located at the second small diameter external gear 63 side and is configured to contact the first housing segment 41, is formed at an end surface 63*e* of the second small diameter external gear 63 within a range of a dedendum circle diameter of the small gear teeth 63*t* (within a dedendum circle of the small gear teeth 63*t*). Furthermore, another contacting end surface of the second small diameter external gear 63, which is located at the second large diameter external gear 62 and is configured to contact the second housing segment 42, is formed at an end surface 63*f* of the second small diameter external gear 63 within a range of a dedendum circle diameter of the large gear teeth 62*t* (within a dedendum circle of the large gear teeth 62*t*). Here, the dedendum circle diameter is a diameter of a circle that touches the bottom of the spaces between the gear teeth of the gear. By forming the end surfaces 63*e*, 63*f* in the above described manner, the thrust regulation of the second intermediate gear 53, which is the compound gear, is performed with the end surfaces 63*e*, 63*f* of the second small diameter external gear 63, which is the small diameter gear. Therefore, the surface areas of the contact portions of the second intermediate gear 53, which are respectively configured to contact the first housing segment 41 and the second housing segment 42, can be reduced, and the torque loss at the operating time can be reduced. The above structure can be also applied to the intermediate gear that has the gears, all of which are formed as the resin gears.

In the second intermediate gear 53 described in the third embodiment, the second large diameter external gear 62 is formed by the metal gear, and the second small diameter external gear 63 is formed by the resin gear. Therefore, the structure of the first intermediate gear 52 of the second embodiment may be modified into a structure that is similar to the structure of the second intermediate gear 53 of the third embodiment. As a result of this modification, the following advantages can be achieved. Specifically, a contact surface area of the first large diameter external gear 57 (the metal gear) 62 relative to the resin of the first small diameter external gear (resin gear) 58 can be increased. Therefore, the first large diameter external gear 57 and the first small diameter external gear 58 can be joined such that relative movement between the first large diameter external gear 57 and the first small diameter external gear 58 is less likely to occur. Furthermore, by forming the center hole at the first small diameter external gear 58, which is the resin gear, the number of the components can be reduced. Furthermore, two contact portions, which are configured to contact the first housing segment 41 and the second housing segment 42, are formed at two end surfaces of the first small diameter external gear 58, which are opposed to each other, within a range of a dedendum circle diameter of the first small diameter external gear 58. The thrust regulation of the first intermediate gear 52, which is the compound gear, is performed with the end surfaces of the first small diameter external gear 58, which is the small diameter gear. Therefore, the surface areas of the contact portions of the first small diameter external gear 58, which are respectively configured to contact the first housing segment 41 and the second housing segment 42, can be reduced, and the torque loss at the operating time can be reduced.

As indicated in another embodiment (OTHER EMB.) shown in FIG. 12, the speed reducer 37 of the actuator 10 may be configured such that the pinion gear 51 is a resin gear, the first large diameter external gear (indicated as LARGE DIAM. EXT. GEAR in FIG. 12) 57 of the first intermediate gear (indicated as 1ST INT. GEAR in FIG. 12) 52 is a resin gear, the first small diameter external gear (indicated as SMALL DIAM. EXT. GEAR in FIG. 12) 58 is a metal gear, the second large diameter external gear (indicated as LARGE DIAM. EXT. GEAR in FIG. 12) 62 of the second intermediate gear (indicated as 2ND INT. GEAR in FIG. 12) 53 is a metal gear, the second small diameter external gear (indicated as SMALL DIAM. EXT. GEAR in FIG. 12) 63 is a resin gear, and the output gear 54 is a resin gear. A vertical double line in FIG. 12 indicates the meshing of the gears. Even in the other embodiment, the output gear 54 and the second small diameter external gear 63 of the second intermediate gear 53 are the resin gears, which are made of the resin. Therefore, each of the output gear 54 and the second small diameter external gear 63 of the second intermediate gear 53 has the inertia that is smaller than that of the metal gear, which is made of the metal. Therefore, in the case where the large impact load is applied to the second intermediate gear 53 by the pulsation of the exhaust gas pressure of the engine 11 through the wastegate valve 19, the valve lever 29, the rod 28, the actuator lever 27, the output shaft 26 and the output gear 54, it is possible to limit the transmission of this impact to the second intermediate gear 53 and the upstream side (motor side) gears, such as the first intermediate gear 52 and the pinion gear 51, which are located on the upstream side of the second intermediate gear 53. Furthermore, in the case where the large impact load is applied to the output gear 54, since the output gear 54 is formed as the resin gear, it is possible to limit the transmission of this impact to the output gear 54 and the upstream side (motor side) gears, such as the second intermediate gear 53, the first intermediate gear 52 and the pinion gear 51, which are located on the upstream side of the output gear 54.

Furthermore, the meshing between the pinion gear 51 and the first large diameter external gear 57 of the first intermediate gear 52 is the meshing between the resin gears, and the meshing between the first small diameter external gear 58 of the first intermediate gear 52 and the second large diameter external gear 62 of the second intermediate gear 53 is the meshing between the metal gears. Furthermore, the meshing between the second small diameter external gear 63 of the second intermediate gear 53 and the output gear 54 is the meshing between the resin gears. Therefore, the meshing between the metal gear and the resin gear does not exist, so that the wearing of the pinion gear 51, the first large diameter external gear 57, the second small diameter external gear 63 and the output gear 54, which are the resin gears, can be limited.

In each of the above embodiments, the speed reducer 37 includes the four gears, i.e., the pinion gear 51, the first intermediate gear 52, the second intermediate gear 53 and the output gear 54. Alternatively, as shown in FIG. 13, the speed reducer 37 may further include a third intermediate gear (indicated as 3RD INT. GEAR in FIG. 13), which includes a third large dimeter external gear (indicated as LARGE DIAM. EXT. GEAR in FIG. 13) and a third small diameter external gear (indicated as SMALL DIAM. EXT. GEAR in FIG. 13) that are respectively meshed with the corresponding gears shown in FIG. 13. In such a case, one of the plurality of gears may be the compound gear that includes the metal gear and the resin gear, and the plurality of gears may be arranged such that each of the metal gears is meshed with a corresponding adjacent one of the metal gears, and each of the resin gears is meshed with a corresponding adjacent one of the resin gears. Like in FIG. 12, even in FIG. 13, a vertical double line indicates the meshing of the gears. Even in each of the embodiments (see each of six rows) shown in FIG. 13, in the case where the large impact load is applied to the third intermediate gear by the pulsation of the exhaust gas pressure of the engine 11 through the wastegate valve 19, the valve lever 29, the rod 28, the actuator lever 27, the output shaft 26 and the output gear 54, it is possible to limit the transmission of this impact to the third intermediate gear and the upstream side (motor side) gears, such as the second intermediate gear 53, the first intermediate gear 52 and the pinion gear 51, which are located on the upstream side of the third intermediate gear. Furthermore, in the case where the large impact load is applied to the output gear 54, since the output gear 54 is formed as the resin gear, it is possible to limit the transmission of this impact to the output gear 54 and the upstream side (motor side) gears, such as the third intermediate gear, the second intermediate gear 53, the first intermediate gear 52 and the pinion gear 51, which are located on the upstream side of the output gear 54. Furthermore, the meshing between the gears is limited to the meshing between the resin gears or the meshing between the metal gears, so that the wearing of the output gear 54, which is the resin gear, and the wearing of the other resin gears can be limited. Furthermore, the speed reducer 37 may include another one or more intermediate gears, so that the number of the gears of the speed reducer 37 may be six or more.

Furthermore, in each of the above embodiments, the second intermediate gear may be eliminated depending on a need. In such a case, the first large diameter external gear 57 of the first intermediate gear 52 is the metal gear, and the first small diameter external gear 58 is the resin gear, and the output gear 54 is the resin gear. Even with this structure, in the case where the large impact load is applied to the first intermediate gear 52 by the pulsation of the exhaust gas pressure of the engine 11 through the wastegate valve 19, the valve lever 29, the rod 28, the actuator lever 27, the output shaft 26 and the output gear 54, it is possible to limit the transmission of this impact to the first intermediate gear 52 and the upstream side (motor side) gear, such as the pinion gear 51, which is located on the upstream side of the first intermediate gear 52. Furthermore, in the case where the large impact load is applied to the output gear 54, since the output gear 54 is formed as the resin gear, it is possible to limit the transmission of this impact to the output gear 54 and the upstream side (motor side) gears, such as the first intermediate gear 52 and the pinion gear 51, which are located on the upstream side of the output gear 54. Therefore, since the meshing between the metal gear and the resin gear does not exist, the wearing of the first small diameter external gear 58 and the output gear 54, which are the resin gears, can be limited. Furthermore, the output gear 54 is the resin gear and includes the magnets (serving as the magnetic flux generators) 66, 67. Therefore, even if the first small diameter external gear 58 and the output gear 54 are worn, it is possible to reduce the adhesion of abrasion particles, such as metal particles, to the, the magnets (the magnetic flux generators) 66, 67.

Furthermore, there may be adapted a structure, in which the second intermediate gear 53 of the third embodiment is applied to the actuator 10 of the first embodiment. Furthermore, the structure of the second intermediate gear 53 of the third embodiment may be applied to the structure of the first intermediate gear 52 of the second embodiment.

In each of the above embodiments, each resin gear is not necessarily limited to the gear that has the gear teeth entirely made of the resin. That is, one or more of the resin gears may be a gear that has metal gear teeth coated with resin.

The present disclosure should not be limited to the above embodiments and may be implemented in various forms within a scope of the present disclosure. For example, the technical features of the respective embodiments, which correspond to the technical features of the aspects of the present disclosure recited in the summary section, may be appropriately replaced with another one or more technical features or may be combined with the technical features of the other embodiment(s) to achieve a portion or all of the objective(s) or to achieve a portion of all of the advantages discussed above. Further, if the technical feature(s) is not described as essential in the present specification, it may be eliminated as appropriate.

The present disclosure may be implemented in the following manner.

(1) According to one aspect of the present disclosure, there is provided an actuator configured to drive a boost pressure control valve of a supercharger. The actuator includes an electric motor; an output shaft; and a speed reducer that is configured to transmit rotation, which is outputted from the electric motor, to the output shaft after reducing a speed of the rotation outputted from the electric motor. The speed reducer has a plurality of gears that include an output gear joined to the output shaft. The plurality of gears further includes a metal gear and a resin gear of a compound gear, which are respectively formed as a large diameter gear and a small diameter gear and are integrated together in one piece. The output gear is a resin gear. According to this aspect, the speed reducer includes the compound gear that has the metal gear (large diameter gear), which has the large diameter, and the resin gear (small diameter gear), which has the small diameter.

(2) The actuator according to the above aspect may include: a magnetic flux sensing device that is configured to sense a rotational angle of the output shaft through use of a magnetic flux; and a magnetic flux generator that is installed to the output gear and is configured to generate the magnetic flux. According to this aspect, the magnetic flux generator is installed to the output gear, which is the resin gear, so that it is possible to reduce adhesion of abrasion particles to the magnetic flux generator.

(3) In the actuator according to the above aspect, the resin gear of the compound gear may be meshed with the output gear. According to this aspect, the resin gear, which is the small diameter gear, of the compound gear is meshed with the output gear, which is the resin gear, so that wearing of the output gear and the resin gear of the compound gear can be limited.

(4) In the actuator according to the above aspect, each of the rest of the plurality of gears other than the output gear and the resin gear of the compound gear meshed with the output gear may be a metal gear. According to this aspect, since each of the rest of the plurality of gears other than the output gear and the resin gear of the compound gear meshed with the output gear is the metal gear, the size of the high speed side gear (the motor side gear) can be reduced, and the sizes of the output gear and the small diameter gear of the compound gear, which are designed to implement the same size and the same speed reduction ratio of the previously proposed actuator, can be increased. Therefore, the wearing of the output gear and the small diameter gear of the compound gear can be limited.

(5) In the actuator according to the above aspect, the plurality of gears may include a plurality of metal gears and a plurality of resin gears. Furthermore, the plurality of metal gears may include the metal gear of the compound gear. Also, the plurality of resin gears may include the resin gear of the compound gear and the output gear. Each of the plurality of metal gears is meshed with another one of the plurality of metal gears, and each of the plurality of resin gears is meshed with another one of the plurality of resin gears. Therefore, the meshing between the gears is limited to the meshing between the resin gears and the meshing between the metal gears, and there is no meshing between the resin gear and the metal gear. Thus, it is possible to limit stress concentration and an increase in the specific wear amount caused by the meshing between the different materials that have substantially different physical properties, and thereby it is possible to limit the wearing of the resin gears.

(6) In the actuator according to the above aspect, the metal gear of the compound gear may have a contact surface, which is located on a radially inner side of a plurality of large gear teeth of the metal gear and is configured to contact resin of the resin gear of the compound gear. According to this aspect, in the compound gear, the metal gear, which is formed as the large diameter gear, and the resin gear, which is formed as the small diameter gear, can be joined such that the relative movement between the metal gear and the resin gear is less likely to occur in the compound gear.

(7) The actuator according to the above aspect may include a shaft that supports the compound gear, and the resin gear of the compound gear may have a center hole that receives the shaft, which rotatably supports the resin gear of the compound gear. According to this aspect, by forming the center hole at the resin gear, the number of the components can be reduced.

(8) The actuator according to the above aspect may further include: a housing that receives the electric motor, the output shaft and the speed reducer at an inside of the housing; and a case that is installed to the housing to cover the inside of the housing, wherein one end portion of the shaft is fixed to the housing, and another end portion of the shaft is supported by the case. According to this aspect, the other end portion of the shaft is supported by the case, so that in comparison to a case where the shaft is supported only at one of two end portions of the shaft, deformation of the shaft caused by the vibration and/or torque can be reduced, and thereby wearing of the compound gear installed to the shaft can be limited.

(9) In the actuator according to the above aspect, with respect to two end surfaces of the compound gear, which are opposite to each other in an axial direction of the shaft and are configured to contact the housing and the case respectively, one of the two end surfaces, which is located on one axial side where the metal gear of the compound gear is placed, may be formed within a range of a dedendum circle diameter of a plurality of large gear teeth of the metal gear of the compound gear, and another one of the two end surfaces of the compound gear, which is located on another axial side where the resin gear of the compound gear is placed, may be formed within a range of a dedendum circle diameter of a plurality of small gear teeth of the resin gear of the compound gear. According to this aspect, with respect to the two end surfaces of the compound gear, which are opposite to each other in the axial direction of the shaft and are configured to contact the housing and the case respectively, the one of the two end surfaces, which is located on the one axial side where the metal gear of the compound gear is placed, is formed within the range of the dedendum circle diameter of the plurality of large gear teeth of the metal gear of the compound gear, and the another one of the two end surfaces of the compound gear, which is located on another axial side where the resin gear of the compound gear is placed, is be formed within the range of the dedendum circle diameter of the plurality of small gear teeth of the resin gear of the compound gear. Therefore, the thrust regulation of the compound gear is performed with the respective end surfaces of the compound gear. Furthermore, since each of the two end surfaces is located on the inner side of the dedendum circle of the corresponding gear, the size of the end surface can be reduced, and the torque loss at the operating time can be reduced.

The present disclosure can be implemented in various other forms. For example, besides the actuator, which is configured to open and close the waste gate valve of the turbocharger, the present disclosure may be implemented as another type of actuator that is configured to control a boost pressure of a supercharger, such as an actuator, which is for a twin-turbocharger having two turbines and is configured to switch between the two turbines, or an actuator that is configured to switch a turbine of a variable-geometry turbocharger.

What is claimed is:

1. An actuator configured to drive a boost pressure control valve of a supercharger, the actuator comprising:
   an electric motor;
   an output shaft; and
   a speed reducer that is configured to transmit rotation, which is outputted from the electric motor, to the output shaft after reducing a speed of the rotation outputted from the electric motor, wherein:
   the speed reducer has a plurality of gears that include an output gear joined to the output shaft;
   the plurality of gears further includes a metal gear and a resin gear of a compound gear, which are respectively formed as a large diameter gear and a small diameter gear and are integrated together in one piece; and
   the output gear is a resin gear.

2. The actuator according to claim 1, comprising:
   a magnetic flux sensing device that is configured to sense a rotational angle of the output shaft through use of a magnetic flux; and
   a magnetic flux generator that is installed to the output gear and is configured to generate the magnetic flux.

3. The actuator according to claim 1, wherein the resin gear of the compound gear is meshed with the output gear.

4. The actuator according to claim 1, wherein each of the rest of the plurality of gears other than the output gear and the resin gear of the compound gear meshed with the output gear is a metal gear.

5. The actuator according to claim 1, wherein:
   the plurality of gears includes a plurality of metal gears and a plurality of resin gears;
   the plurality of metal gears includes the metal gear of the compound gear;
   the plurality of resin gears includes the resin gear of the compound gear and the output gear;
   each of the plurality of metal gears is meshed with another one of the plurality of metal gears; and
   each of the plurality of resin gears is meshed with another one of the plurality of resin gears.

6. The actuator according to claim 1, wherein the metal gear of the compound gear has a contact surface, which is located on a radially inner side of a plurality of large gear teeth of the metal gear and is configured to contact resin of the resin gear of the compound gear.

7. The actuator according to claim 1, further comprising a shaft that supports the compound gear, wherein the resin gear of the compound gear has a center hole that receives the shaft, which rotatably supports the resin gear of the compound gear.

8. The actuator according to claim 7, further comprising:
   a housing that receives the electric motor, the output shaft and the speed reducer at an inside of the housing; and
   a case that is installed to the housing to cover the inside of the housing, wherein one end portion of the shaft is fixed to the housing, and another end portion of the shaft is supported by the case.

9. The actuator according to claim 8, wherein with respect to two end surfaces of the compound gear, which are opposite to each other in an axial direction of the shaft and are configured to contact the housing and the case respectively, one of the two end surfaces, which is located on one axial side where the metal gear of the compound gear is placed, is formed within a range of a dedendum circle diameter of a plurality of large gear teeth of the metal gear of the compound gear, and another one of the two end surfaces of the compound gear, which is located on another axial side where the resin gear of the compound gear is placed, is formed within a range of a dedendum circle diameter of a plurality of small gear teeth of the resin gear of the compound gear.

* * * * *